United States Patent
Roberds et al.

(10) Patent No.: US 11,803,011 B1
(45) Date of Patent: Oct. 31, 2023

(54) OPTICAL SWITCH HAVING LATCHED SWITCH STATES AND ASSOCIATED METHODS

(71) Applicant: EAGLE TECHNOLOGY, LLC, Melbourne, FL (US)

(72) Inventors: Brian Roberds, San Marcos, CA (US); Edward W. Miles, Vista, CA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/658,829

(22) Filed: Apr. 12, 2022

(51) Int. Cl.
G02B 6/122 (2006.01)
G02B 6/35 (2006.01)
G02B 6/12 (2006.01)

(52) U.S. Cl.
CPC ......... G02B 6/1228 (2013.01); G02B 6/3536 (2013.01); G02B 6/358 (2013.01); G02B 2006/12038 (2013.01); G02B 2006/12145 (2013.01); G02B 2006/12195 (2013.01)

(58) Field of Classification Search
CPC ........... G02B 6/1228; G02B 6/358; G02B 2006/12038; G02B 2006/12145; G02B 2006/12195
See application file for complete search history.

(56) References Cited

U.S. PATENT DOCUMENTS

| 4,243,296 A | 1/1981 | Aulich et al. |
| 4,291,940 A | 9/1981 | Kawasaki et al. |
| 4,299,609 A | 11/1981 | Aulich et al. |
| 4,449,781 A | 5/1984 | Lightstone et al. |
| 4,591,372 A | 5/1986 | Bricheno et al. |
| 4,786,130 A | 11/1988 | Georgiou et al. |
| 4,900,119 A | 2/1990 | Hill et al. |
| 5,136,670 A * | 8/1992 | Shigematsu ............ G02F 1/293 385/16 |
| 5,295,205 A * | 3/1994 | Miller ................. G02B 6/29332 65/408 |
| 6,317,526 B1 * | 11/2001 | Shirasaki .............. G02F 1/2252 356/477 |
| 7,149,391 B1 * | 12/2006 | El-Sherif .............. G02F 1/3131 385/39 |
| 9,340,446 B1 | 5/2016 | Baleine et al. |

(Continued)

FOREIGN PATENT DOCUMENTS

| CN | 107162429 A | 9/2017 |
| CN | 111999957 | 11/2020 |

(Continued)

OTHER PUBLICATIONS

Soref et al., "Electro-Optical Switching at 1550 nm Using a Two-State GeSe Phase-Change Layer," Optics Express; vol. 23, No. 2; Jan. 26, 2015; pp. 1536-1546.

(Continued)

Primary Examiner — Daniel Petkovsek
(74) Attorney, Agent, or Firm — ALLEN, DYER, DOPPELT, + GILCHRIST, P.A.

(57) ABSTRACT

An optical switch has latched switch states and includes optical fibers that are laterally joined together to define an optical switching portion. At least one phase change material (PCM) layer is on the optical switching portion so that a phase of the PCM layer determines a latched switch state from among the latched switch states.

22 Claims, 9 Drawing Sheets

(56) References Cited

U.S. PATENT DOCUMENTS

| | | | |
|---|---|---|---|
| 10,009,670 | B2 | 6/2018 | Mazed et al. |
| 10,105,918 | B2 | 10/2018 | Thind et al. |
| 10,185,202 | B2 | 1/2019 | Mazed et al. |
| 10,634,938 | B2 | 4/2020 | Fang et al. |
| 11,231,603 | B2 | 1/2022 | Fang et al. |
| 11,231,635 | B2 | 1/2022 | Moon et al. |
| 11,609,443 | B2 | 3/2023 | Miao et al. |
| 2008/0121859 | A1 | 5/2008 | Campbell |
| 2014/0319708 | A1 | 10/2014 | Thind et al. |
| 2018/0007454 | A1 | 1/2018 | Mazed et al. |
| 2018/0196327 | A1 | 7/2018 | Mazed et al. |
| 2018/0284492 | A1 | 10/2018 | Fang et al. |
| 2019/0250435 | A1* | 8/2019 | Mazed ............... G02F 1/035 |
| 2020/0379276 | A1 | 12/2020 | Miao et al. |
| 2021/0149271 | A1 | 5/2021 | Moon et al. |
| 2021/0234330 | A1 | 7/2021 | Gan et al. |
| 2021/0333575 | A1 | 10/2021 | Hu et al. |

FOREIGN PATENT DOCUMENTS

| | | | |
|---|---|---|---|
| CN | 114371532 A * | 4/2022 | ............ G02B 6/125 |
| WO | 03/025626 A2 | 3/2003 | |
| WO | 2021/255451 A1 | 12/2021 | |

OTHER PUBLICATIONS

Xu et al., "Low-Loss and Broadband Nonvolatile Phase-Change Directional Coupler Switches," ACS Photonics vol. 6, No. 2; Jan. 7, 2019; pp. 553-557.

Zhang et al., "Broadband Transparent Optical Phase Change Materials for High-Performance Nonvolatile Photonics," Nature Communications; (2019) 10:4279; pp. 1-9.

Delaney et al., A New Family of Ultralow Loss Reversible Phase-Change Materials for Photonic Integrated Circuits: Sb 2 S 3 and Sb 2 Se 3. Advanced Functional Materials. 30. 2002447. 10.1 002/adfm.202002447; 2020 (Year: 2020).

Irawan et al., Innovation of Multi Directional Fiber Couplers, ICGST-PDCS Journal, vol. 12, Issue 1, Dec. 2012 (Year: 2012).

Liu et al., The investigations of characteristics of GeSe thin films and selector devices for phase change memory, Journal of Alloys and Compounds, vol. 792, 2019, pp. 510-518, ISSN 0925-8388, https://doi.org/1 0.1 016/j.allcom.2019.04.041. (Year: 2019).

Mikarni et al., Phase Tuning in Optical Directional Coupler, Japanese Journal of Applied Physics, vol. 16, No. S1, 1977 (Year: 1977).

Rios et al., Ultra-compact nonvolatile photonics based on electrically reprogrammable transparent phase change materials, May 13, 2021; arXiv:21 05.0601 Ov1 ; https://doi.org/1 0.48550/arXiv.21 05.06010 (Year: 2021).

Simon et al. Phase change in Ge-Se chalcogenide glasses and its implications on optical temperature-sensing devices. J Mater Sci: Mater Electron 31, 11211-11226 (2020). https://doi .org/1 0.1 007/s1 0854-020-03669-0 (Year: 2020).

Meister et al., Matching p-i-n-junctions and optical modes enables fast and ultra-small silicon modulators, Opt. Express 21, 16210-16221 (2013) (Year: 2013).

Tsuda, Hiroyuki. (2010). Ultra-compact optical switch using phase-change material. 10.1109/ACP.2010.5682618. (Year: 2010).

Parra, J., Pernice, W.H.P. & Sanchis, P. All-optical phase control in nanophotonic silicon waveguides with epsilon-near-zero nanoheaters. Sci Rep 11, 947 4 (2021 ). https://doi.org/1 0.1 038/s41598-021-88865-6 (Year: 2021).

Zhang et al. "Broadband nonvolatile photonic switching based on optical phase change materials: beyond the classical figure-of-merit", Optical Society of America, Optics Letters, vol. 43, No. 1, Jan. 2018, pp. 94-97.

* cited by examiner

OPTICAL SWITCH HAVING LATCHED SWITCH STATES AND ASSOCIATED METHODS

FIELD OF THE INVENTION

The present invention relates to the field of optics, and, more particularly, to optical switches and related methods.

BACKGROUND OF THE INVENTION

Optical systems regularly use active devices to control or switch optical power or signals on demand. Currently, there are few optical materials available to switch optical devices and maintain a latched state. Instead, many optical devices rely on a continuous power control, such as an optical signal or a thermal, electrical, or mechanical force to maintain the optical device in a desired configuration. Most available materials used in optical devices and associated switches are considered "non-latching." Examples include non-linear optical devices such as liquid crystals that may react to changes in electric fields, thermo-optic devices that may react to changes in temperature, and piezo-optic devices that may react to changes in mechanical strain. Many conventional non-latching optical switching devices use an optical signal for control and function as non-linear optics under intense laser power.

Some optical switches are formed from discrete optical and electronic components, or are formed as photonic integrated circuit (PIC) structures based on semiconductor wafer fabrication processes. Discrete optical switches tend to be large, and use a separate electrical power source to operate. For a PIC, a large power penalty occurs going from the optical fiber into the PIC and back out of the PIC into another optical fiber. These losses may be greater than one decibel.

There are few optical materials that can vary their refractive index and maintain a set index of refraction without using an outside power source for continuous latching. Many optical devices thus employ polarizable materials such as liquid crystals, lithium niobate ($LiNbO_3$) materials, or piezo-optic materials. Devices made from these materials are typically slow and may be anisotropic and birefringent, thus making them polarization dependent and non-latching. Most electric field or optically switched materials have a relatively small index change of less than about 0.01, or are orders of magnitude smaller.

Some optical devices employ chalcogenides for an $X^3$ photo refractive effect, but not for the optical benefits of a phase change. Those chalcogenides used for their phase change properties are commonly used in electronic or optical memories and have not been reliable as an active optical material due to absorption or large index values. Other optical devices may couple chalcogenide materials with mechanical mechanisms, such as an actuator, or a microelectromechanical device, but these optical devices are limited because of their use of an external actuator or MEMS device.

SUMMARY OF THE INVENTION

In general, an optical switch having a plurality of latched switch states may comprise a plurality of optical fibers laterally joined together to define an optical switching portion, and at least one phase change material (PCM) layer on the optical switching portion so that a phase of the PCM layer determines a latched switch state from among the plurality of latched switch states.

The plurality of latched switch states may correspond to a plurality of different continuous optical fiber signal paths. The optical switching portion may have a tapered diameter shape. At least one of the plurality of optical fibers may be configured to supply optical energy to the optical switching portion to selectively change the phase of the PCM layer. An optical energy source may be coupled to the at least one of the plurality of optical fibers and operable at a different wavelength for heating than a wavelength for signal transmission.

An electrically conductive layer may be on at least one of the plurality of optical fibers and electrically coupled to the PCM layer to selectively change the phase of the PCM layer. A heat source may be thermally coupled to the PCM layer to selectively change the phase of the PCM layer. The at least one PCM layer may comprise first and second PCM layers on opposite sides of the optical switching portion. Each of the plurality of optical fibers may comprise a single mode optical fiber. The PCM layer may comprise a chalcogenide.

The optical switches may be configured into an array, for example. Another aspect is directed to a method for making an optical switch having a plurality of latched switch states. The method may comprise laterally joining together a plurality of optical fibers to define an optical switching portion, and forming at least one phase change material (PCM) layer on the optical switching portion so that a phase of the PCM layer determines a latched switch state from among the plurality of latched switch states.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
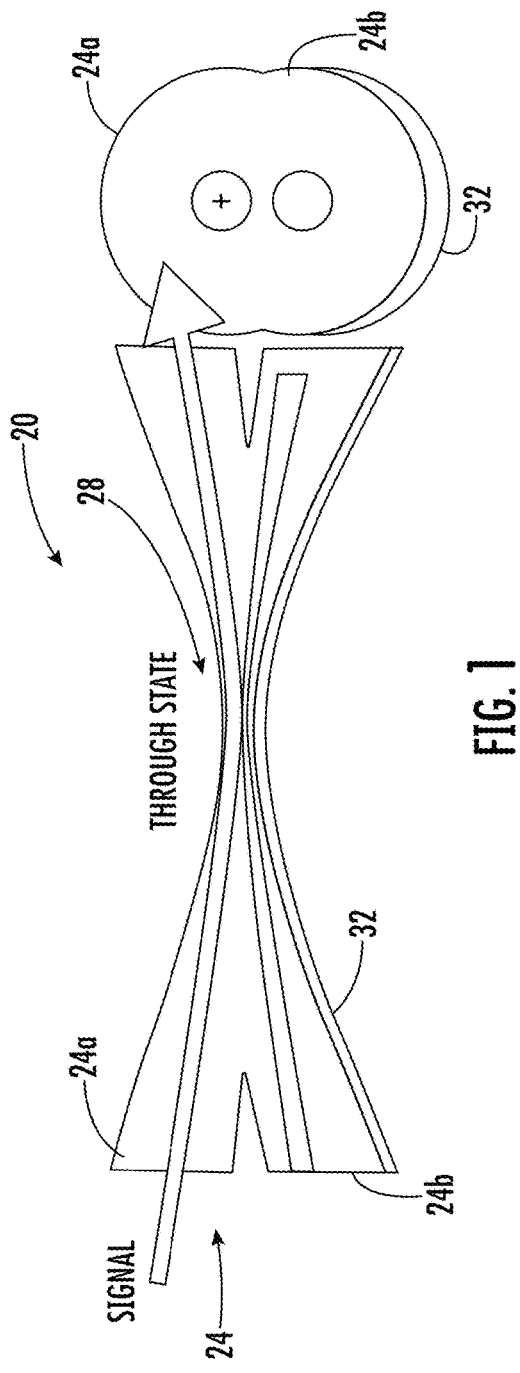
FIG. 1 is a schematic sectional view of an optical switch having a phase change material (PCM) layer where its phase determines a latched switch state according to the invention.
Figure 2:
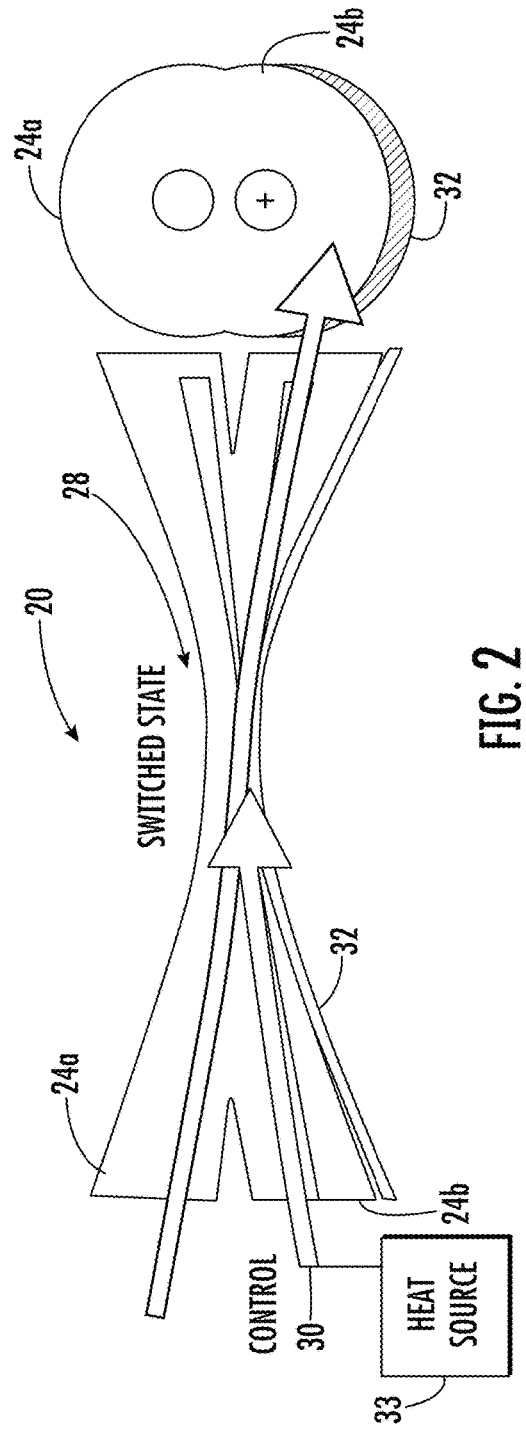
FIG. 2 is another schematic sectional view of the optical switch of FIG. 1 showing its switched state.

Referring now to FIGS. 1 and 2, there is illustrated generally at 20, an optical device formed in this example as an optical switch having a plurality of latched switch states. A plurality of optical fibers 24 are laterally joined together to define an optical switching portion 28, and in this example formed as a tapered diameter shape. Although any number of optical fibers may be employed, in the example shown in FIGS. 1 and 2, two optical fibers 24a,24b are laterally joined together with a first optical fiber 24a being a through fiber through which an initial optical signal is transmitted (FIG. 1), and a second optical fiber 24b acting as the drop fiber to which the optical signal may be switched via a control signal 30 such as an optical pulse (FIG. 2).

At least one phase change material (PCM) layer 32 is formed on the optical switching portion 28. The phase of the PCM layer may determine a latched switch state from among the plurality of latched switch states, which may be changed by application of heat from a heat source 33 as explained further below such as generated from an optical, thermal or electrical energy source. As best illustrated in the change of the optical signal path from the optical switch 20 shown in FIG. 1 to that shown in FIG. 2, the plurality of latched switch states corresponds to a plurality of different continuous optical fiber signal paths, and in this example, changing from the through or first optical fiber 24a into the second optical fiber 24b, also termed the drop fiber through which the control signal 30 passes.

The end views of the optical switch 20 in FIGS. 1 and 2 are illustrated at the right and show in the through state of FIG. 1 the optical signal passing through the first optical fiber 24a shown by the "plus" sign on the right. The switched state is shown in FIG. 2, and the phase of the PCM layer 32 changes the latched state so that the optical signal passes from the through or first optical fiber 24a into the drop or second optical fiber 24b as shown by the plus sign in the second fiber of FIG. 2. The PCM layer 32 in the end view of FIG. 2 includes hash lines indicating a phase change. In this example, the control signal 30, as a separate optical signal, supplies optical energy to the optical switching portion 28, which may be a different wavelength for heating than a wavelength for signal transmission. For example, a wavelength below approximately 700 nm, where the PCM starts to significantly absorb light, may be optimum for thermal processes to initiate a phase change created by thermal heat in the PCM layer 32. A wavelength between about 700 nm and 430 nm is possible. The long wavelength limit is defined by the onset of absorption of the light by the PCM and the lower wavelength limit is defined by the transmission or absorption of the transporting waveguide, the example here being $SiO_2$ glass fiber.

Figure 6:
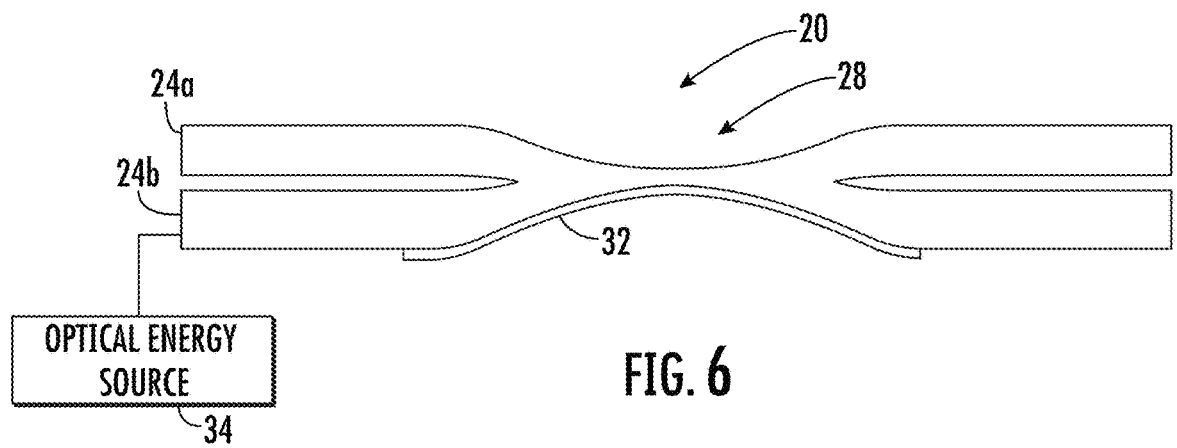
FIG. 6 is another schematic sectional view of the optical switch showing an optical energy source coupled to an optical fiber.

As a non-limiting example, either one of the first and second optical fibers 24a,24b may be configured to supply optical energy to the optical switching portion 28 to selectively change the phase of the PCM layer 32. An optical energy source 34 (FIG. 6), such as a laser or other source of optical energy, may be coupled to at least one of the plurality of optical fibers 24 and operable at a different wavelength for heating than a wavelength for signal transmission. In the example shown in FIG. 6, the optical energy source 34 is coupled to the second optical fiber 24b as the drop fiber.

Each of the plurality of optical fibers 24 may be formed as a single mode optical fiber, but depending on the end use requirements, one or more of the optical fibers may be formed as a multimodal optical fiber. In this example, the control signal 30 provides the optical energy, and resultant heat, to change the phase of the PCM layer 32 that is formed on one side of the optical switching portion 28 forming the optical switch 20. As a result, the optical phase matching condition of this optical device as an optical switch 20 is altered and the optical signal switches from the first optical fiber 24a to the second optical fiber 24b. Once switched, the control signal in this example as the light from the optical energy source 34 (FIG. 6) is removed and the optical device, in this example the optical switch 20, remains latched until the process is reversed.

The PCM layer 32 is preferably formed from a chalcogenide as a chemical compound and includes a sulfide, selenide, telluride, or polonide. It is a material that when in the correct stoichiometry range is transparent at optical telecommunication wavelengths, such as a wavelength range of 1,260 nm to 1,625 nm, and in an example, the commercially well-known 1,300 and 1,550 nanometer bands, although wavelengths as low as about 850 nm are possible. The PCM layer 32 may switch variably between two index values using electrical, thermal, or optical energy. The phase changes may occur between the temperatures giving a full molten state and temperatures giving crystallization. This material as the PCM layer 32 latches and remains in a given state upon removal of power, and has a much lower index of refraction than the more conventional phase change materials used with electronic or optical memories, for example. This material as the PCM layer 32 is more readily configured into optical devices that use traditional optical materials with low index values, such as the illustrated optical switch 20.

This optically transparent chalcogenide glass may have a general formulation and stoichiometry of $Ge_X Se_{100-X}$ within the range as noted above. This material as the PCM layer 32 may provide changes in a large index of refraction greater than 10%, but remain in a given latched state indefinitely. The PCM layer 32 takes advantage of the thermally induced structural phase changes to vary the index of refraction, which is switchable and reversible, and remains latched in a given state once switched. It is low-loss in the telecom wavelengths in both states.

Figure 3:
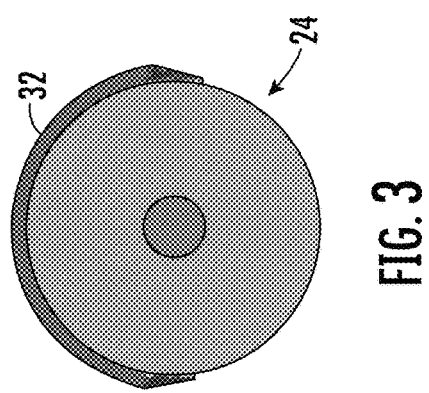
FIG. 3 is a sectional view of an example optical fiber of FIGS. 1 and 2 showing the PCM layer.

Referring again to FIG. 3, the PCM layer 32 may be formed on about half of an optical fiber 24, in this example, about 50% of the optical fiber by directionally coating the PCM material onto the optical fiber, which in the illustrated example of FIGS. 1 and 2 is the second optical fiber 24*b*. The PCM layer 32 may be coated for length of about 0.1 to 20 millimeters along the length of the optical fiber 24*b* at a depth of a few nanometers thickness, and in a non-limiting example, about no greater than 40 nm to prevent the PCM layer from becoming a waveguide itself.

Figure 5:
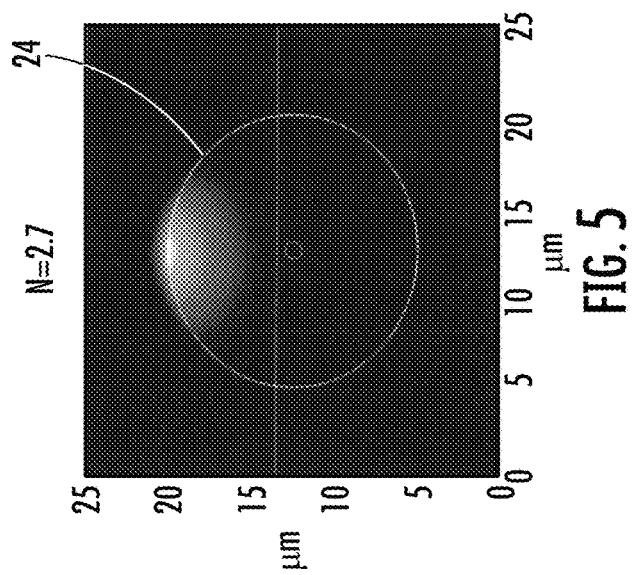
FIG. 5 is another image of the optical fiber similar to FIG. 4 where the changed phase of the PCM layer moves the mode field to an upper region to implement a latched switch state.
Figure 4:
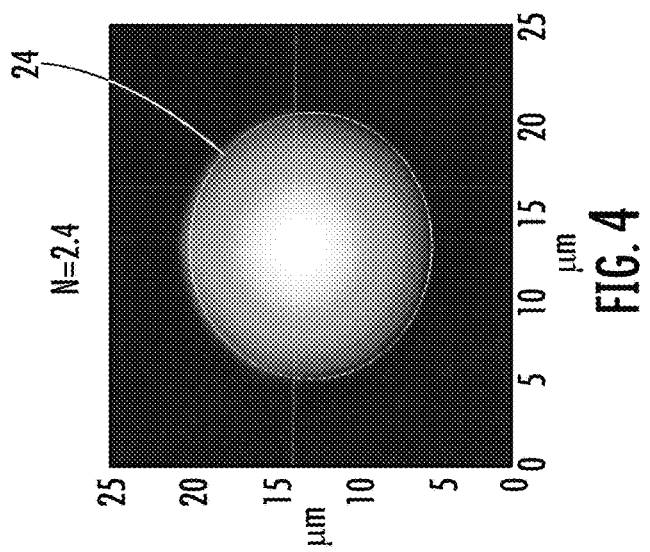
FIG. 4 is an image of the optical fiber of FIG. 3 showing an optical mode field within the central portion of the optical fiber.
Figure 7:
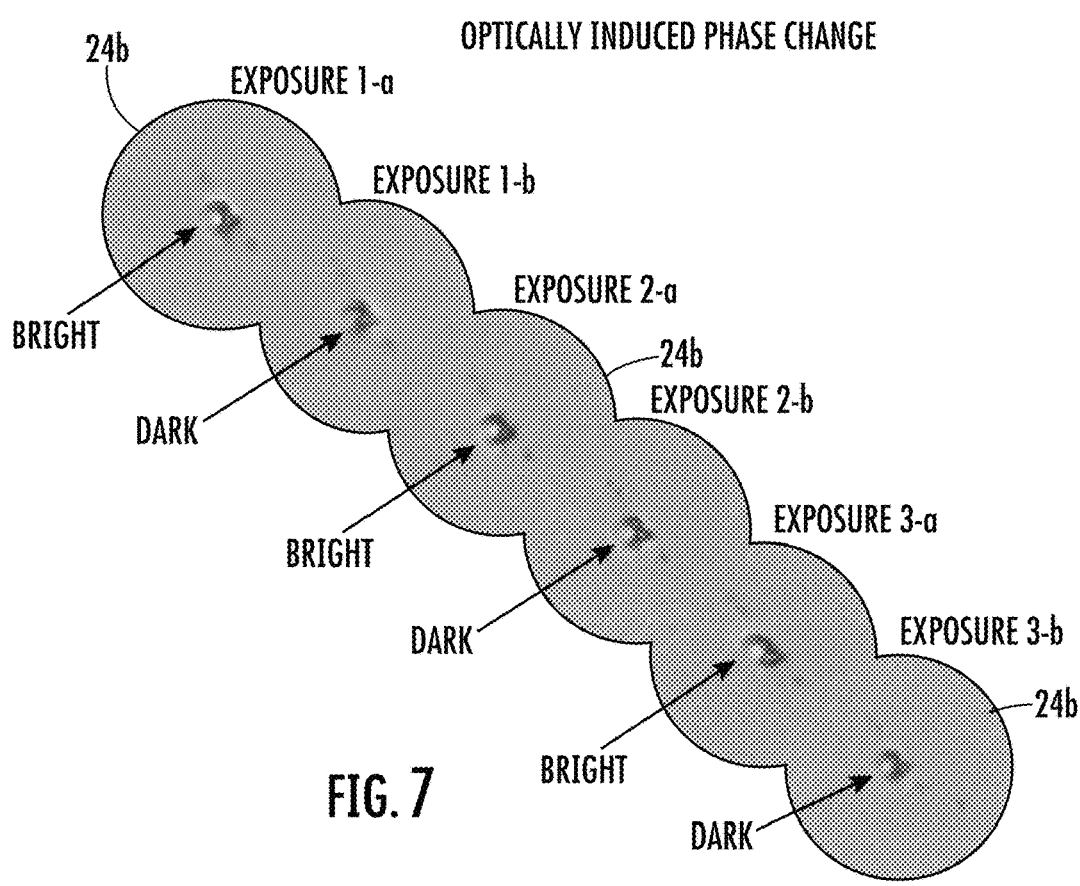
FIG. 7 is a graphical view of multiple optical fibers showing different exposures created by optical energy that determines a phase change.

As shown in the image of FIG. 4, with the representation distance in micrometers on both the vertical and horizontal axis, the optical fiber 24 is shown having an optical mode field in the central portion of the optical fiber with an N of about 2.4. In the image of FIG. 5, the change in phase of the PCM layer 32 with an N of about 2.7 moves the mode field to an upper region of only a few micrometers in the optical fiber 24 to implement a latched switch state. The sectional, schematic view in FIG. 7 of multiple optical fibers 24 illustrates different exposures created by the optical energy from an optical energy source 34 (FIG. 6) that induces a phase change. The schematic views in FIG. 7 show alternating bright, dark, bright exposures that allow switching back and forth in the optical switch 20 between different latched switch states.

Figure 8:
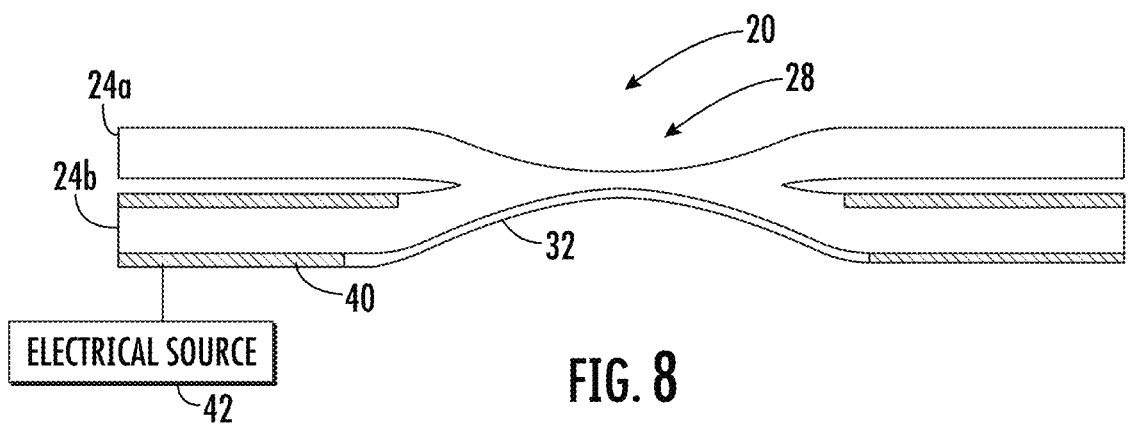
FIG. 8 is another schematic sectional view of the optical switch showing an electrically conductive layer on an optical fiber and electrically coupled to the PCM layer.

It is also possible to include an electrical source 42 and a conductive layer 40 (FIG. 8) on at least one of the plurality of optical fibers 24 and electrically coupled to the PCM layer 32 to selectively change the phase of the PCM layer at the optical switch 20. As illustrated, the optical fiber 24, in this example the drop or second optical fiber 24*b*, is coated with an electrically conductive layer 40 such as gold at about a few microns thickness such as about 2-3 microns as a non-limiting example. The distance along the optical fiber 24*b* to which the PCM layer 32 will be applied may have its electrically conductive layer 40 removed, and the PCM layer applied such as by various coating technologies. That optical fiber 24*b* section having the electrically conductive layer 40 removed and the PCM layer 32 applied, is joined laterally with another optical fiber, in this example, the first optical fiber 24*a*, to form the optical device as an optical switch 20 shown in FIG. 8.

Figure 9:
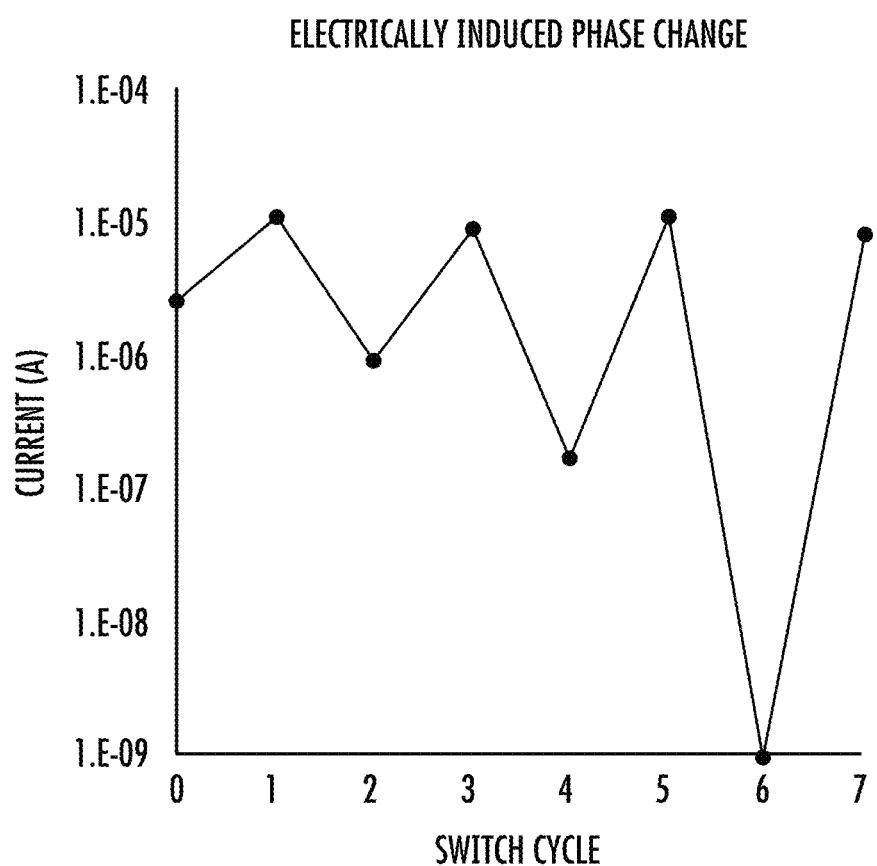
FIG. 9 is a graph showing the results of an electrically induced change in the PCM layer of FIG. 8.

An example for the electrically induced phase change as imparted by an electrical signal directed along the electrically conductive layer 40 into the PCM layer 32 is shown by the graph of FIG. 9, where the current in amperes is shown on the vertical axis and the switch cycle for the latched switch state changes back-and-forth in 7 cycles, shown on the horizontal axis. The graph shows that ohmic heating from an electrical current is able to change the phase of the PCM layer 32.

Figure 10:
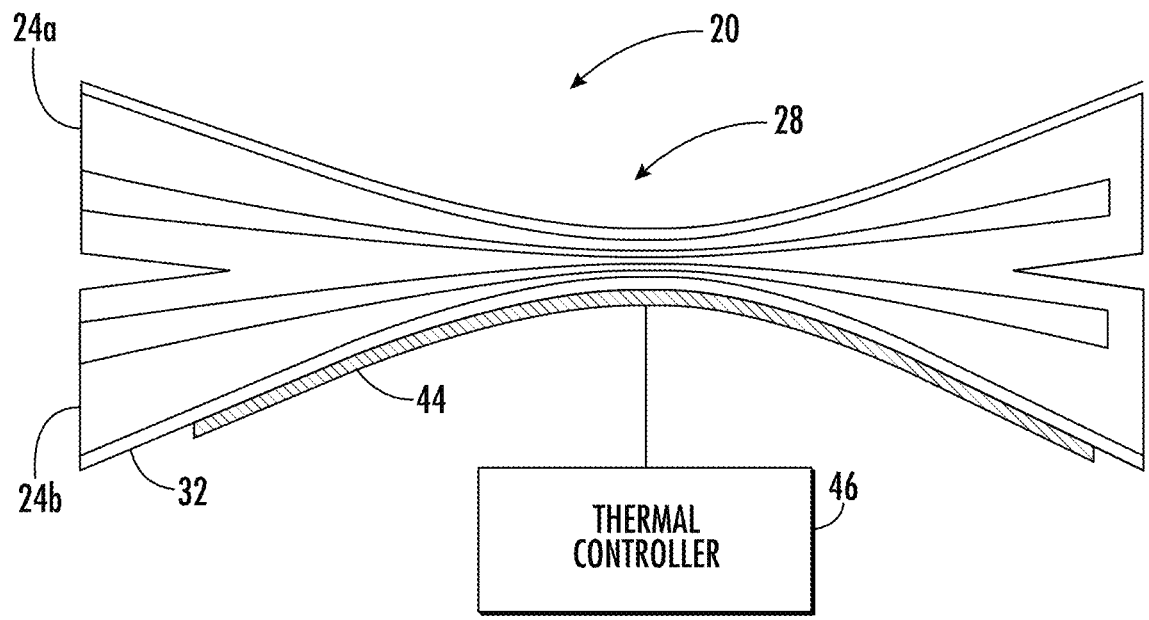
FIG. 10 is another schematic sectional view of the optical switch showing a heat source thermally coupled to the PCM layer.

In another example, a heat source 44 may be thermally coupled to the PCM layer 32 to selectively change the phase of the PCM layer as shown in the example of the optical switch 20 in FIG. 10. A thermal heat controller 46 connected to the heat source 44 controls thermal heating onto the PCM layer 32. The heat may be generated for only a few nanoseconds, for example, from 1 or 2 nanoseconds up to 10's of nanoseconds, to create the phase change.

Figure 11:
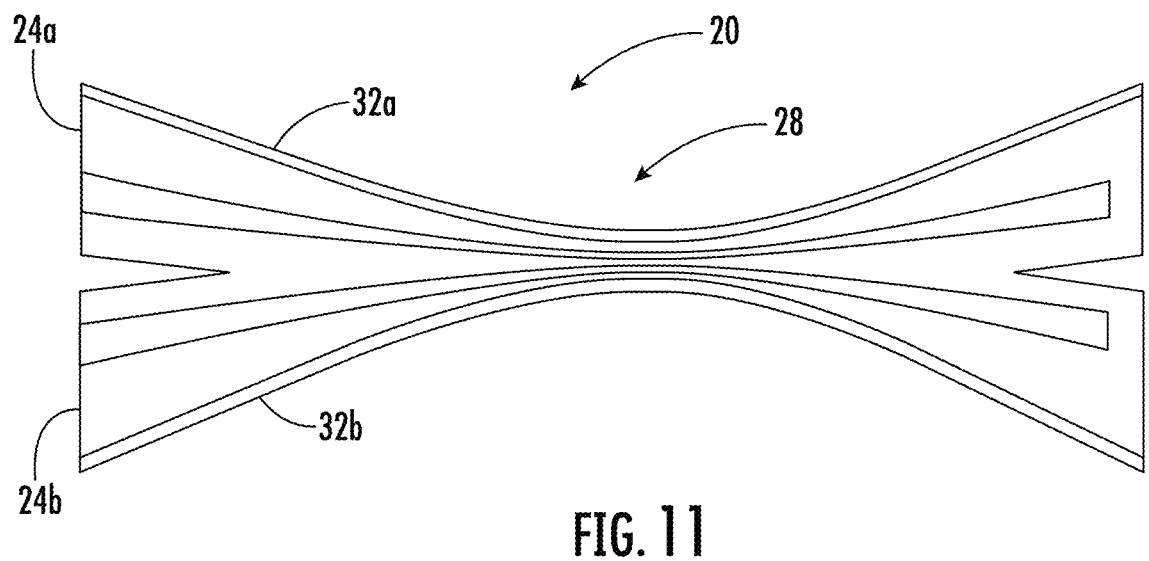
FIG. 11 is another schematic sectional view of the optical switch showing first and second PCM layers on opposite sides of the optical switching portion.

It is also possible that the PCM layer 32 may be formed as first and second PCM layers 32*a*,32*b* on opposite sides of the optical switching portion 28 as shown in FIG. 11. Each of the PCM layers 32*a*,32*b* may be used to determine a latched switch state by applying heat via an optical signal into the respective optical fiber 24*a*,24*b* using an optical energy source 34, such as in FIG. 6, or an electrical signal applied via an electrically conductive layer 40 such as in FIG. 8, or a separate heat source 44 as in FIG. 10.

Figure 12:
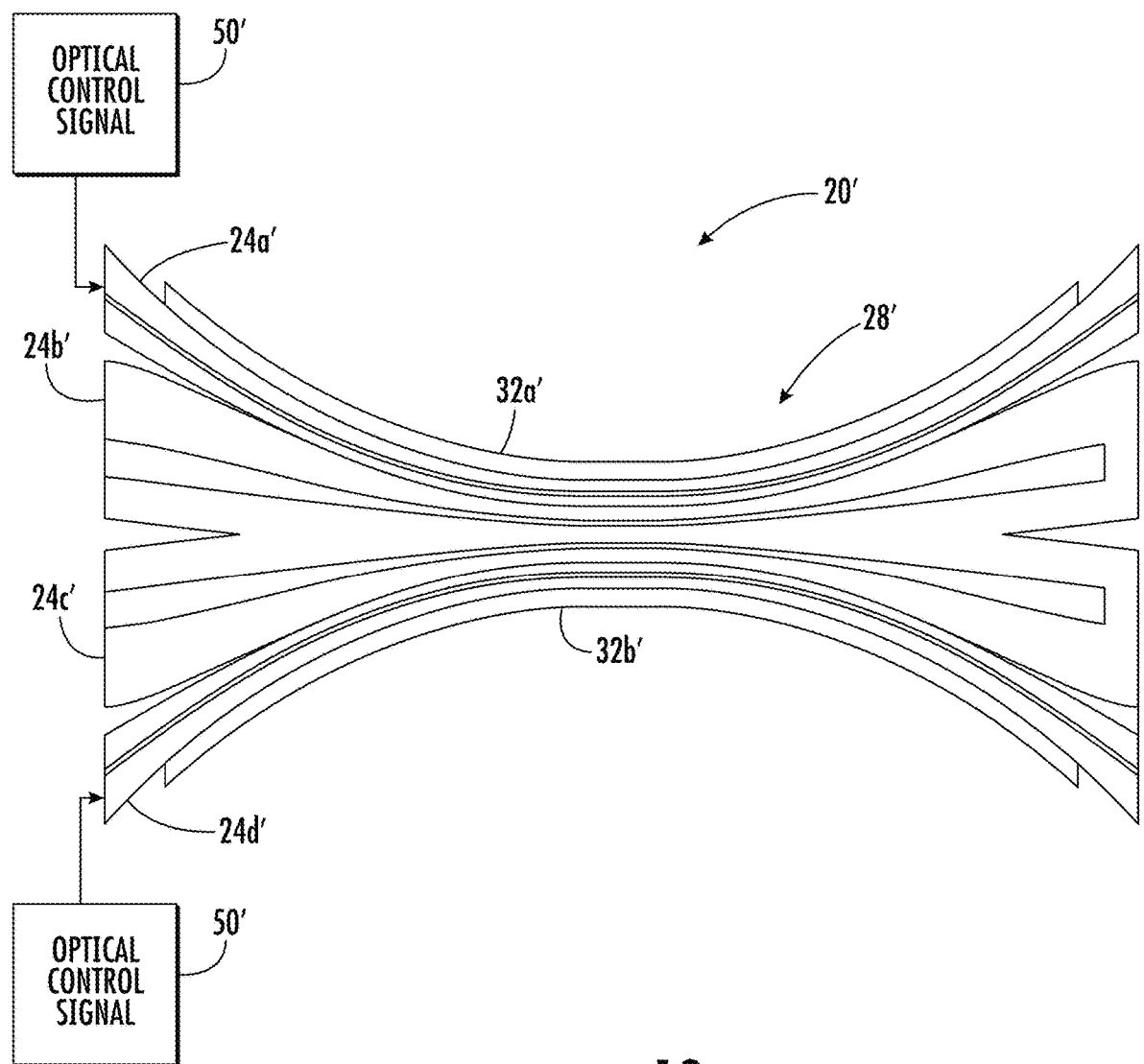
FIG. 12 is another schematic sectional view of an optical device, such as an optical switch, showing four optical fibers and first and second PCM layers.

In an embodiment shown in FIG. 12, the optical switch 20' includes four optical fibers 24*a*', 24*b*', 24*c*', 24*d*' and first and second PCM layers 32*a*', 32*b*' are on opposite sides of the optical switching portion 28' formed from the tapered area of the four optical fibers. An optical input to the optical switch 20' may include two separate optical signal inputs, with a first optical signal entering optical fiber 24*b*', and the second optical signal entering optical fiber 24*c*'. These may be selectively switched into two different outputs as two different signal paths. The optical control signal 50' may be generated from an optical signal, electric current, or thermal heating as in FIGS. 6, 8, and 10.

Figure 13:
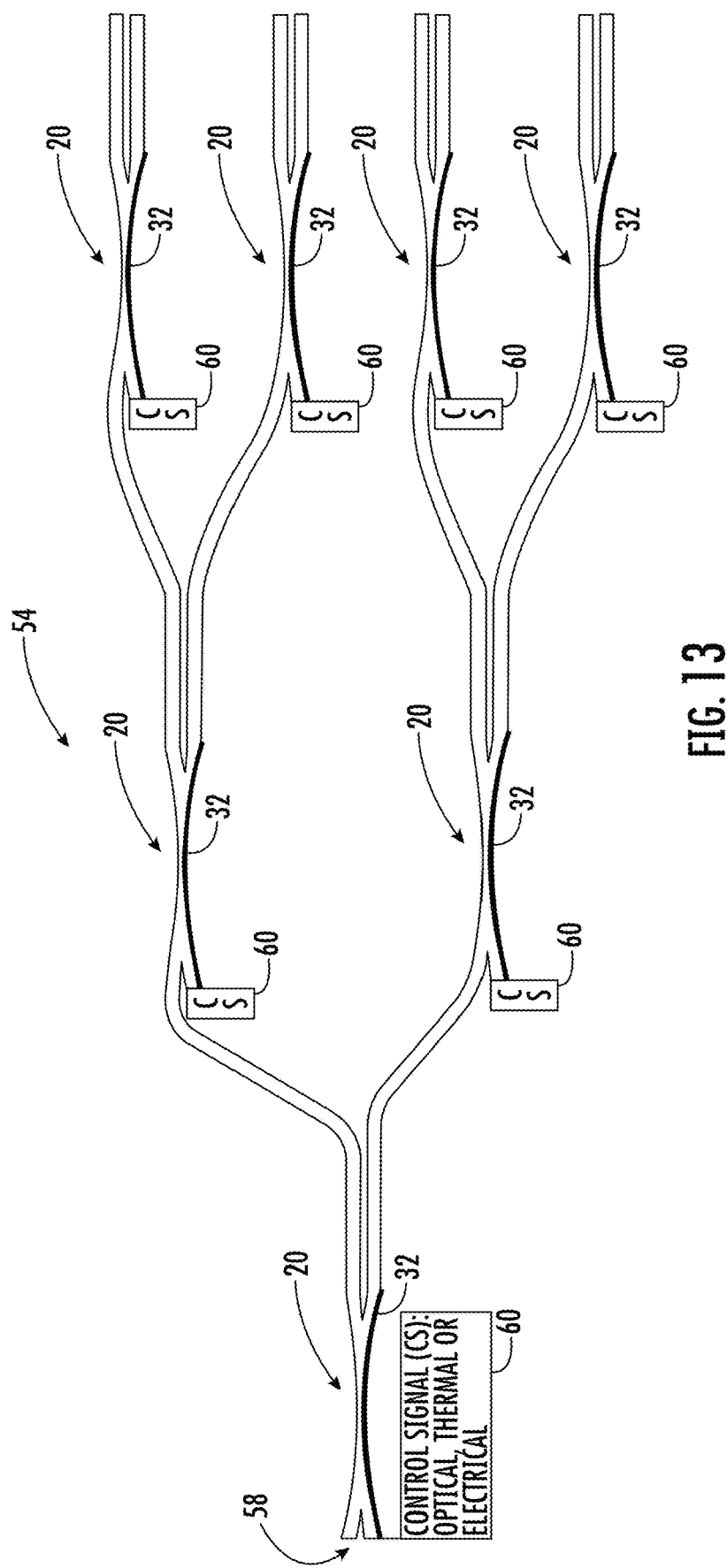
FIG. 13 is a schematic representation of an optical switching device having optical switches arranged in an array.

In the example of FIG. 13, a plurality of optical switches 20 are arranged in a switched array illustrated generally at 54, where each optical switch 20 has a plurality of latched switch states. This switched array 54 forms an optical device that may operate similar to a field programmable gate array (FPGA) and have one input 58 in this example. Each optical switch 20 includes a PCM layer 32 that may latch the respective optical switch into a different state using a control signal 60 applied at each optical switch as illustrated. The control signal 60 may be an optical signal, a thermally generated input to a heat source, or electrical power signal along conductive layer such as shown in respective FIGS. 6, 8, and 10.

Figure 14:
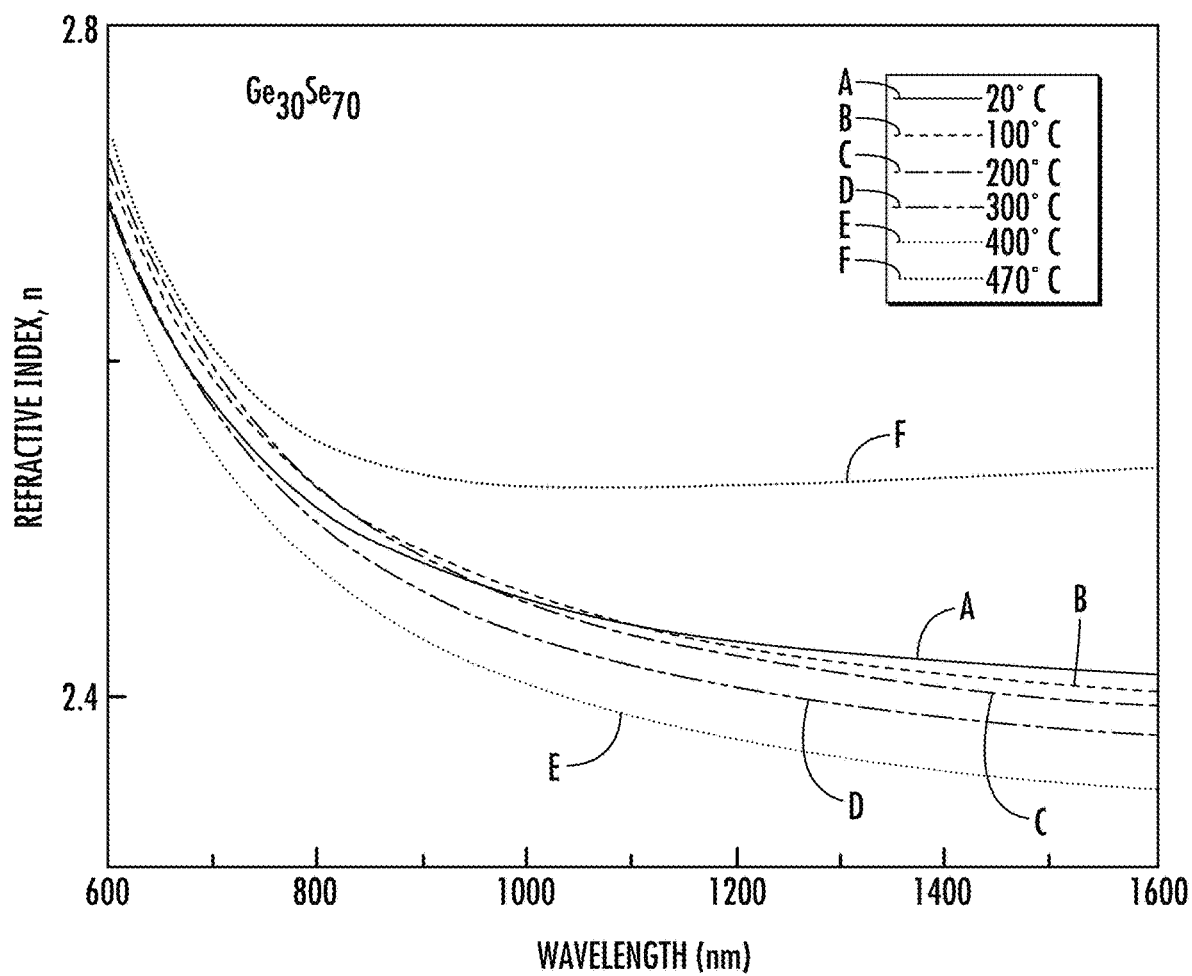
FIG. 14 is a graph showing an example of the low refractive index and large index variation of a PCM layer using a chalcogenide glass as germanium and selenium in a specific stoichiometric ratio ($Ge_{30}Se_{70}$).

An example PCM layer 32 may be formed from $Ge_{30}Se_{70}$ as noted before. The graph in FIG. 14 shows the refractive index relative to the wavelength in nanometers at different temperatures for the PCM layer 32 formed with the stoichiometry ratio $Ge_{30}Se_{70}$, ranging from 20° C. as shown by the line at A up to about 470° C. as shown by the line at F. This range between the lines at the 1,600 nanometers mark illustrates the low refractive index with a large index variation of the PCM layer 32.

An example single mode fiber may be used for the optical fibers 24 and have about 125 micron cladding and an 8-10 micron core. When two optical fibers 32*a*,32*b* are laterally joined together to define the optical switching portion 28 such as shown in FIGS. 1, 2, 6, 8, and 10-11, the diameter of the optical switching portion may be reduced to about 10 microns to 40 microns with the tapered diameter shape.

Figure 15:
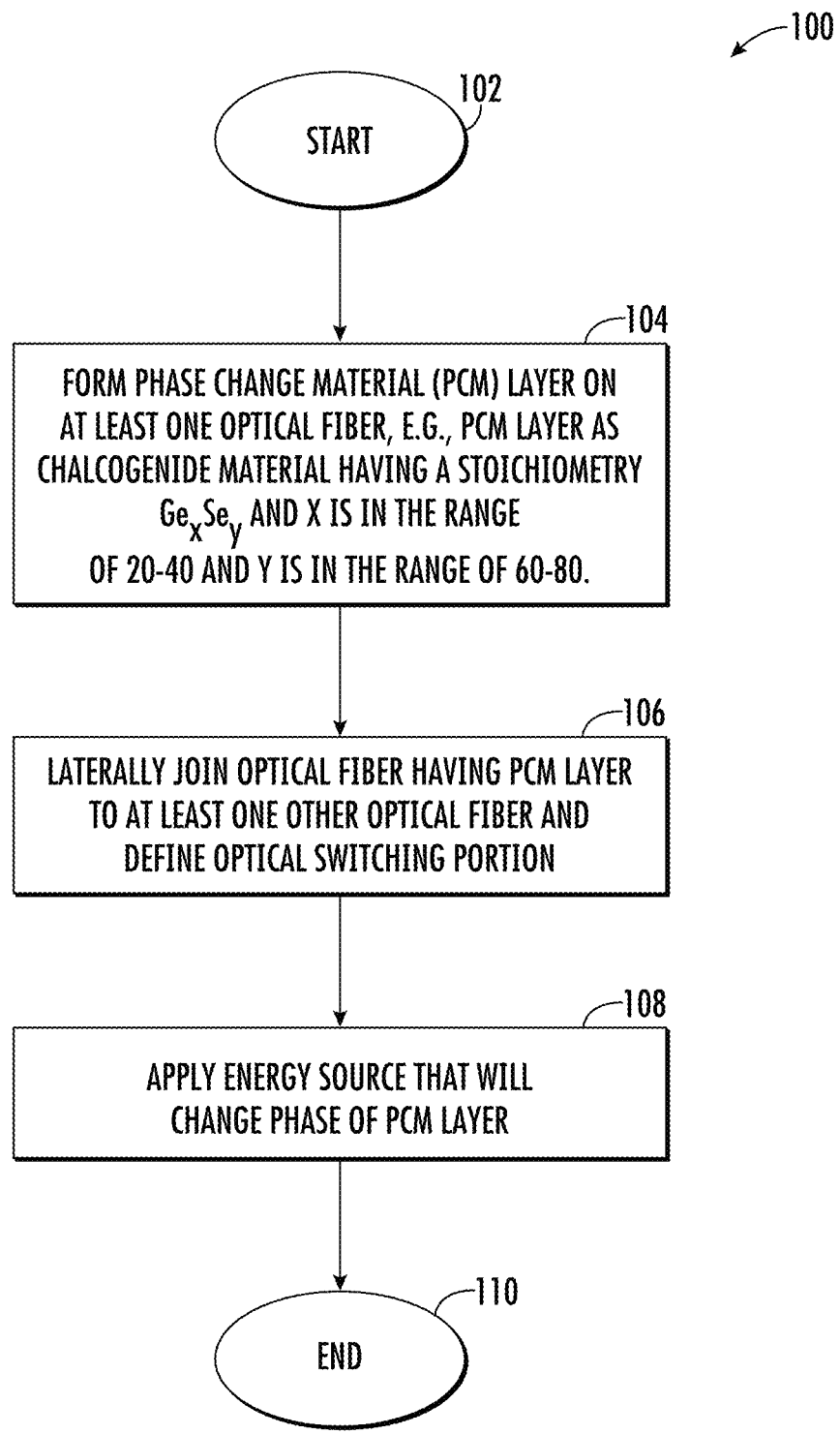
FIG. 15 is a high-level flowchart illustrating an example method of making an optical device as an optical switch as shown in FIG. 1 having a PCM layer.

Referring now to FIG. 15, a high-level flowchart illustrates an example of making an optical device as an optical switch 20 and illustrated generally at 100. General steps are described first relative to the flowchart, followed by a more detailed process flow description.

The process starts (Block 102) and the phase change material (PCM) layer 32 is formed on at least one optical fiber 24 (Block 104). This PCM layer 32 may comprise a chalcogenide material, and in an example, $Ge_XSe_Y$, where X is in the range of about 20-40, and Y is in the range of about 60-80. This optical fiber 24 may be laterally joined with another optical fiber to define an optical switching portion 28 (Block 106). Energy may be applied to the optical switching portion 28 to selectively change the phase of the PCM layer 32, such as using an electrically coupled conductive layer, a heat source thermally coupled to the PCM layer, or optical signal energy (Block 108). The process ends (Block 110).

As a more detailed process flow description, the process would start with the fusing of the glass and pulling a taper (very high temperatures). Then the process may include directionally coating one side of the fiber/coupler with the PCM that cannot withstand the high temperatures of the tapering process, e.g., using a fused biconical taper coupler process, which is the most prevalent in industry. Another method in line with the description would be to use polished or "D"-shaped fibers to access close to the core regions and deposit PCM on one of the faces prior to gluing the two faces together. A polished and glued coupler is not very prevalent in industry.

This application is related to copending patent application entitled, "OPTICAL DEVICE HAVING PHASE CHANGE MATERIAL AND ASSOCIATED METHODS," which is filed on the same date and by the same Assignee, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. An optical switch having a plurality of latched switch states and comprising:
    a plurality of individual optical fibers having respective adjacent tapered medial portions laterally joined together to define an optical switching portion with a tapered diameter shape; and
    at least one phase change material (PCM) layer on the optical switching portion so that a phase of the PCM layer determines a latched switch state from among the plurality of latched switch states.

2. The optical switch of claim 1 wherein the plurality of latched switch states corresponds to a plurality of different continuous optical fiber signal paths.

3. The optical switch of claim 1 wherein at least one of the plurality of optical fibers is configured to supply optical energy to the optical switching portion to selectively change the phase of the PCM layer.

4. The optical switch of claim 3 comprising an optical energy source coupled to the at least one of the plurality of optical fibers and operable at a different wavelength for heating than a wavelength for signal transmission.

5. The optical switch of claim 1 comprising an electrically conductive layer on at least one of the plurality of optical fibers and electrically coupled to the PCM layer to selectively change the phase of the PCM layer.

6. The optical switch of claim 1 comprising a heat source thermally coupled to the PCM layer to selectively change the phase of the PCM layer.

7. The optical switch of claim 1 wherein the at least one PCM layer comprises first and second PCM layers on opposite sides of the optical switching portion.

8. The optical switch of claim 1 wherein each of the plurality of optical fibers comprises a single mode optical fiber.

9. The optical switch of claim 1 wherein the PCM layer comprises a chalcogenide.

10. An optical switching array device comprising:
    a plurality of optical switches arranged in an array, each optical switch of the plurality of optical switches having a plurality of latched switch states and comprising
        a plurality of individual optical fibers having respective adjacent tapered medial portions laterally joined together to define an optical switching portion with a tapered diameter shape, and
        at least one phase change material (PCM) layer on the optical switching portion so that a phase of the PCM layer determines a latched switch state from among the plurality of latched switch states.

11. The optical switching array device of claim 10 wherein the plurality of latched switch states corresponds to a plurality of different continuous optical fiber signal paths.

12. The optical switching array device of claim 10 wherein at least one of the plurality of optical fibers is configured to supply optical energy to the optical switching portion to selectively change the phase of the PCM layer.

13. The optical switching array device of claim 12 comprising an optical energy source coupled to the at least one of the plurality of optical fibers and operable at a different wavelength for heating than a wavelength for signal transmission.

14. The optical switching array device of claim 10 comprising an electrically conductive layer on at least one of the plurality of optical fibers and electrically coupled to the PCM layer to selectively change the phase of the PCM layer.

15. The optical switching array device of claim 10 comprising a heat source thermally coupled to the PCM layer to selectively change the phase of the PCM layer.

16. The optical switching array device of claim 10 wherein the at least one PCM layer comprises first and second PCM layers on opposite sides of the optical switching portion.

17. The optical switching array device of claim 10 wherein each of the plurality of optical fibers comprises a single mode optical fiber.

18. The optical switching array device of claim 10 wherein the PCM layer comprises a chalcogenide.

19. A method for making an optical switch having a plurality of latched switch states, the method comprising:
    laterally joining together respective adjacent tapered medial portions of a plurality of individual optical fibers to define an optical switching portion having a tapered diameter shape; and
    forming at least one phase change material (PCM) layer on the optical switching portion so that a phase of the PCM layer determines a latched switch state from among the plurality of latched switch states.

20. The method of claim 19 wherein the plurality of latched switch states corresponds to a plurality of different continuous optical fiber signal paths.

21. The method of claim 19 wherein each of the plurality of optical fibers comprises a single mode optical fiber.

22. The method of claim 19 wherein the PCM layer comprises a chalcogenide.

* * * * *